(12) United States Patent
Lannoije et al.

(10) Patent No.: US 10,103,583 B2
(45) Date of Patent: Oct. 16, 2018

(54) OBJECT DETECTION SYSTEM AND METHOD FOR OPERATING AN OBJECT DETECTION SYSTEM

(71) Applicant: Bombardier Primove GmbH, Mannheim (DE)

(72) Inventors: Marnix Lannoije, Balen (BE); John De Clerqc, Lede (BE); Geert Vanden Bossche, Michelbeke (BE); Jeroen Martens, Maldegem (BE)

(73) Assignee: Bombardier Primove GmbH, Mannheim (DE)

( * ) Notice: Subject to any disclaimer, the term of this patent is extended or adjusted under 35 U.S.C. 154(b) by 125 days.

(21) Appl. No.: 14/901,218

(22) PCT Filed: Jun. 24, 2014

(86) PCT No.: PCT/EP2014/063231
§ 371 (c)(1),
(2) Date: Dec. 28, 2015

(87) PCT Pub. No.: WO2014/206961
PCT Pub. Date: Dec. 31, 2014

(65) Prior Publication Data
US 2016/0372980 A1    Dec. 22, 2016

(30) Foreign Application Priority Data

Jun. 25, 2013 (GB) .................................. 1311289.1

(51) Int. Cl.
*G01R 27/28* (2006.01)
*H02J 50/60* (2016.01)
(Continued)

(52) U.S. Cl.
CPC .............. *H02J 50/60* (2016.02); *B60L 5/005* (2013.01); *B60L 11/182* (2013.01);
(Continued)

(58) Field of Classification Search
CPC ................................ H02J 50/60; G01V 3/101
(Continued)

(56) References Cited

U.S. PATENT DOCUMENTS 5,029,300 A    7/1991  Ishibashi et al.
6,215,365 B1 *  4/2001  Kurkovskiy ........... H03K 3/014
                                                324/236
(Continued)

FOREIGN PATENT DOCUMENTS

CN    102457106 A    5/2012
CN    102598167 A    7/2012
(Continued)

*Primary Examiner* — Giovanni Astacio-Oquendo
(74) *Attorney, Agent, or Firm* — The Webb Law Firm

(57) ABSTRACT

An object detection system for an inductive power transfer system, for transferring power to a vehicle on a surface of a route. The object detection system comprises at least one LC oscillating circuit and at least one driving circuit. An input side of the driving circuit is connected to a power supply circuit and an output side of the driving circuit is connected to the at least one LC oscillating circuit. The driving circuit provides an alternating current voltage to the at least one oscillating circuit. The object detection system comprises at least one means for capturing an input power to the driving circuit provided by the power supply circuit and the object detection system comprises at least one detection means for detecting a foreign object depending on the captured input power.

20 Claims, 8 Drawing Sheets

(51) Int. Cl.
*H02J 50/40* (2016.01)
*H02J 7/02* (2016.01)
*B60L 11/18* (2006.01)
*H02J 17/00* (2006.01)
*H02J 50/12* (2016.01)
*B60L 5/00* (2006.01)
*G01V 3/10* (2006.01)

(52) U.S. Cl.
CPC .......... *B60L 11/1829* (2013.01); *G01V 3/101* (2013.01); *H02J 7/025* (2013.01); *H02J 17/00* (2013.01); *H02J 50/12* (2016.02); *H02J 50/40* (2016.02); *B60L 2230/10* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC ..................................... 324/655, 22, 207.12
See application file for complete search history.

(56) References Cited

U.S. PATENT DOCUMENTS

| | | | |
|---|---|---|---|
| 7,152,727 B2* | 12/2006 | Waechter | G07D 5/08 194/302 |
| 2004/0130916 A1 | 7/2004 | Baarman | |
| 2008/0036546 A1* | 2/2008 | Taylor | G01B 5/0014 331/66 |
| 2008/0054905 A1 | 3/2008 | Linse et al. | |
| 2009/0224609 A1 | 9/2009 | Cook et al. | |
| 2009/0243397 A1 | 10/2009 | Cook et al. | |
| 2012/0091989 A1 | 4/2012 | Uramoto et al. | |
| 2012/0146580 A1 | 6/2012 | Kitamura | |
| 2012/0181875 A1 | 7/2012 | Wechlin et al. | |
| 2013/0099592 A1 | 4/2013 | Abe | |
| 2013/0127259 A1 | 5/2013 | Lohr et al. | |
| 2017/0060150 A1* | 3/2017 | Stefanski | G05D 23/27 |
| 2018/0036740 A1* | 2/2018 | Nelson | B02C 19/18 |
| 2018/0059176 A1* | 3/2018 | Ding | G01R 31/2891 |

FOREIGN PATENT DOCUMENTS

| | | |
|---|---|---|
| CN | 103069689 A | 4/2013 |
| CN | 103138405 A | 6/2013 |
| DE | 102011086904 A1 | 5/2013 |
| EP | 1022840 A2 | 7/2000 |
| EP | 2590300 A1 | 5/2013 |
| GB | 2496968 A | 5/2013 |
| GB | 2508923 A | 6/2014 |
| JP | 2006230129 A | 8/2006 |
| JP | 2008237007 A | 10/2008 |
| JP | 2010284006 A | 12/2010 |
| WO | 2011116874 A2 | 9/2011 |
| WO | 2013036947 A2 | 3/2013 |

\* cited by examiner

OBJECT DETECTION SYSTEM AND METHOD FOR OPERATING AN OBJECT DETECTION SYSTEM

CROSS-REFERENCE TO RELATED APPLICATIONS

This application is the United States national phase of International Application No. PCT/EP2014/063231 filed Jun. 24, 2014, and claims priority to United Kingdom Patent Application No. 1311289.1 filed Jun. 25, 2013, the disclosures of which are hereby incorporated in their entirety by reference.

BACKGROUND OF THE INVENTION

Field of the Invention

The invention relates to an object detection system for an inductive power transfer system, in particular for transferring power to a vehicle on a surface of a route. Furthermore, the invention relates to a method of operating such an object detection system.

Description of Related Art

WO 2013/036947 A2 discloses a foreign object debris detection system for a wireless energy transfer system comprising at least one magnetic field sensor and at least one readout circuit to measuring electrical parameters of the at least one magnetic field sensor. The at least one magnetic field sensor is positioned within the magnetic field of the wireless energy transfer system.

GB 1222712.0 (not yet disclosed) discloses a safety system for an inductive power transfer system for transferring power to a vehicle on a surface of a route. The document discloses that a detection winding can be part of a LC oscillating circuit.

US 2008/0054905 A1 discloses metal detectors including a sense coil coupled to an analog to digital converter that produces a numeric representation of an electrical signal associated with the conductive object situated in an active region of a sense coil. The document describes that an electric signal in an alternating current part of a LC oscillating circuit is used to detect a foreign object.

U.S. Pat. No. 5,029,300 discloses a sensor which comprises an oscillating circuit including an LC resonant circuit, wherein a detection signal is prohibited upon arrival of an external radio wave.

SUMMARY OF THE INVENTION

It is an object of the present invention to provide an object detection system for an inductive power transfer system, in particular for transferring power to a vehicle on a surface of a route, wherein a detection quality, in particular a detection reliability, is improved and which allows detection of a foreign object with a high sensitivity and a high reliability. Another object of the invention is to provide a method of operating such a foreign object detection system and a method of manufacturing such an object detection system.

It is a basic idea of the present invention to capture an input power to a driving circuit which operates a LC oscillating circuit, wherein the input power is captured in a direct current part of the object detection system.

An object detection system for an inductive power transfer system is proposed, in particular for a primary system of said power transfer system. In general, the object detection system can be part of the primary unit and/or the secondary unit of the inductive power transfer system. The inductive power transfer system can be used for transferring power to a vehicle on a surface of a route.

The present invention can be applied in particular to the field of energy transfer to any land vehicle, in particular track bound vehicles, such as rail vehicles (e.g. trams), but also to road automobiles, such as individual (private) passenger cars or public transport vehicles (e.g. busses). A problem in such devices is that it is generally not possible to mechanically prevent foreign objects, in particular objects made of metal, from being placed into proximity of the primary unit of an inductive power transfer system. Such foreign objects may e.g. comprise a coin, a can, a key, a tool and other objects. The varying magnetic field generated by the primary unit and a secondary unit may induce current in the foreign objects made of metal and in other objects or fluids. Such currents may cause power losses and heating of the object. Heating of the foreign objects may be dangerous for e.g. persons trying to touch and remove the foreign object and/or may damage the surface the foreign object is placed on or parts of the primary unit. Also, a heated object can cause fire.

The inductive power transfer system can comprise a route-sided primary unit with a primary winding structure. The primary winding structure generates a primary electromagnetic field which is received by a vehicle-sided secondary unit, which is also known as receiver or pick-up. In between the primary winding structure and a secondary winding structure of the secondary unit, there is an air gap through which the primary field extends. The secondary winding structure can generate a secondary field, e.g. if a current flows in the secondary winding structure. This current can e.g. be generated at least partially by the mutual induction between the primary winding structure and the secondary winding structure.

The inductive power transfer system can be a transfer system for so-called static energy transfer or static charging, wherein the vehicle to which the energy is transferred to does not move, i.e. is at a halt or rests or moves with a low speed. In this case, the primary unit can be designed as a so-called charging pad, wherein the charging pad is integrated into the route or mounted on the route surface (elevated charging pad).

The inductive power transfer system can also be a so-called dynamic transfer system, wherein the vehicle to which the energy is transferred to travels along the driving surface of the route.

A charging surface, which can also be denoted as active area, of the route can be assigned to the primary winding. The charging surface can be a subpart of the route surface through which the primary field or a predetermined portion, e.g. a portion larger than 80%, 90% or 95%, of the primary field extends during inductive power transfer, in particular during static charging. The charging surface can have the same or larger dimensions, e.g. width and length, as an envelope of the primary winding structure, e.g. a rectangle comprising or enclosing the winding structure of the primary winding. In case of a charging pad, the charging surface can correspond to the surface of the charging pad.

The primary winding structure is usually arranged under a driving surface or standing surface of the route or within such a driving or standing surface. The primary field consequently extends through a part of the driving or standing surface. The foreign object can heat up because of currents induced within the foreign object.

A total field, which can be also referred to as power system transfer field, at least partially consists of the primary field. If no secondary winding structure is located within the proximity, e.g. above, the primary winding structure, the total field will be equal or nearly equal to the primary field. If a secondary winding structure is located within the proximity, e.g. above, the primary winding structure, the total field results from the superposition of the primary field and the secondary field, wherein the secondary field is generated by the secondary winding structure.

The foreign object located within this part or charging surface can heat up because of currents induced within the foreign object. The currents induced within the foreign object can be caused by the total field.

The primary unit comprises the aforementioned primary winding for generating an electromagnetic primary field for the inductive power transfer which can be received by the aforementioned secondary unit.

The object detection system comprises at least one LC oscillating circuit. The LC oscillating circuit can comprise at least one inductive element and one capacitive element. The at least one inductive element can e.g. be provided at least partly by a winding structure, in particular a coil. The winding structure can have one or multiple turns. A geometry of the winding structure can take various forms. It is possible that the winding structure is designed such that circular windings, rectangular, square or even hexagonal windings are provided. The winding structure providing at least part of the inductive element can also be referred to as detection winding.

The winding structure can enclose a detection surface of the winding structure. The winding structure can be arranged such that field lines of the power transfer field extend through the complete detection surface or at least a part of the detection surface. This means that the winding structure can be arranged at least partially within an active area of the primary winding structure. It is, however, also possible to arrange the winding structure outside the active area.

The capacitive element can e.g. be designed as a capacitor. A capacitance of said capacitor can be fixed or variable.

The LC oscillating circuit features a resonant frequency which can be determined depending on the inductance and capacitance of the LC oscillating circuit.

The proposed object detection system further comprises at least one driving circuit. An input side of the driving circuit is connected to a power supply circuit and an output side of the driving circuit is connected to the at least one LC oscillating circuit. The driving circuit provides an alternating current/voltage to the at least one LC oscillating circuit.

In particular, the power supply circuit can be a direct current circuit. In this case, the driving circuit transforms a direct current (DC) voltage which is applied to the input side to an alternating current (AC) voltage which is provided at the output side of the driving circuit and applied to the LC oscillating circuit.

In other words, the object detection system can comprise a DC part and an AC part, wherein the driving circuit connects the DC part to the AC part. This means that the driving circuit can be designed as or comprise an inverter.

The driving circuit can be operated such that the AC output voltage has a predetermined frequency which can be equal or nearly equal to the aforementioned resonant frequency of the LC oscillating circuit. It is, however, also possible that the frequency of the AC output voltage differs from the resonant frequency by at most a predetermined value.

It is also possible that the driving circuit can be operated such that other predetermined or desired characteristics of the AC output voltage, e.g. a desired amplitude and/or desired phase shift, is/are provided. Alternatively or in addition, characteristics of an AC output current can be controlled.

It is possible that the driving circuit comprises at least one protection means for ensuring a safe operation of the driving circuit. Such a protection means can e.g. detect an undesired operational status, e.g. an overcurrent in the driving circuit, an overvoltage of the driving circuit, an undesired temperature of the driving circuit and/or an operation of switches of the driving circuit in a hard switching condition. A hard switching operation means that a switching operation is performed if a voltage across a switch is a non-zero voltage or a current through the switch is a non-zero current. In case such an undesired operational status is detected, the protection means can deactivate the driving circuit.

According to the invention, the object detection system comprises at least one means for capturing an input power to the driving circuit provided by the power supply circuit. The at least one means can e.g. be designed as a power sensor. The at least one means for capturing an input power can be arranged at or within the aforementioned DC part of the object detection system. This means that the input power can be determined depending on DC electrical parameters.

The object detection system comprises further at least one detection means for detecting a foreign object depending on the captured input power. A foreign object can e.g. be detected if an input power changes, in particular if an input power to the driving circuit increases.

By providing an AC output voltage to the LC oscillating circuit, a local (electro-) magnetic field, which can also be referred to as detection field, is generated. A foreign object located in a vicinity of the object detection system alters characteristics of said detection field. This, in turn, leads to a change of power which is needed to generate said local field. The power will adapt automatically if the driving circuit is operated at a constant frequency.

The power to generate the detection field will change because of a power consumed by the foreign object, for example a power consumed by induction of eddy currents within the foreign object. Said eddy currents can e.g. be represented as a resistor and a self induction in the metal object. Another reason for the changing power to generate said detection field is a shift of the resonant frequency of the LC oscillating circuit due to the foreign object placed in the vicinity of the object detection system.

Especially if the LC oscillating circuit is operated close to or at its resonant frequency, a metal object will slightly change said resonant frequency. This change, e.g. an increase of the resonant frequency, while the driving frequency of the driving circuit remains constant results in a change, e.g. an increase, of the dissipation in the LC oscillating circuit.

Thus, the detection is partially based on eddy currents and partially on the changed resonance frequency.

Most of the time, the inductance of the LC oscillating circuit decreases when an object is located in the vicinity of the LC oscillating circuit. Thus, the resonant frequency and consequently the input power increases. But it is also possible that the inductance of the LC oscillating circuit increases. In such a case, the resonant frequency and consequently the input power decreases.

Simulations have shown that power measurement of the input power to the driving circuit advantageously allows a robust, sensitive and reliable object detection. In particular, a detection sensitivity of the proposed object detection system does not depend on the power transfer field.

This means that the quality of detection is not or only minimally reduced by the power transfer field. Also, the proposed object detection system is independent from other environmental conditions, in particular a temperature. A decoupling of the detection sensitivity from the power transfer field can e.g. be provided by integrating a filter element in the LC oscillating circuit, e.g. a high-pass filter or a bandpass filter.

Simulations have also shown that the detection sensitivity for a foreign object by evaluating the captured power allows a reliable detection also in the case that a foreign object is placed within a boundary region of said detection field.

It is important that the detection field is a separate field from the aforementioned power transfer field. This means that the winding structure for generating the detection field is built separate from the primary winding structure.

It is also possible that, if an undesired operational status is detected or the driving circuit is deactivated, a foreign object is detected. This can be based on the effect that a foreign object changes operational conditions of the driving circuit such that an undesired operational status of the driving circuit is achieved. In this case, the detection of the foreign object is based on an operational status of the driving circuit.

In another embodiment, the driving circuit is provided by a half bridge. A half bridge comprises at least two electric or electronic switching elements, e.g. MOSFETs or IGBTs. By controlling switching times of said switching elements, desired characteristics of an AC output voltage can be controlled. This advantageously provides a simple design of the driving circuit.

In a preferred embodiment, the power supply circuit comprises a constant voltage source, wherein the object detection system comprises means for capturing an input current to the driving circuit. The input power is determined depending on an output voltage of the constant voltage source and the captured input current.

The constant voltage source can be connected to the input side of the driving circuit such that the constant output voltage falls across input terminals of the driving circuit. The input current can be measured within a current path connecting the constant voltage source and an input terminal of the driving circuit. This advantageously allows a simple determination of the input power.

In an alternative embodiment, the power supply circuit comprises a constant current source, wherein the object detection system comprises means for capturing an input voltage to the driving circuit. The input power is determined depending on an output current of the constant current source and the captured input voltage. The input voltage can e.g. be captured by a voltage sensor which captures a voltage falling across input terminals of the driving circuit.

This also advantageously allows simple determination of the input power.

In another preferred embodiment, the LC oscillating circuit is designed as a series resonant circuit. This means, that the aforementioned capacitive element and inductive element are connected in series. In this case, the power supply circuit preferably comprises a constant voltage source. Designing the LC oscillating circuit as a series resonant circuit advantageously allows using the characteristic of the LC oscillating circuit as a filter element for a voltage and/or current which is induced in the LC oscillating circuit by the main power transfer field. The capacitor of the series resonant circuit also serves as DC blocking capacitor. The frequency of the main power transfer field is preferably lower than the resonant frequency of the series resonant circuit.

In an alternative embodiment, the LC oscillating circuit is designed as a parallel resonant circuit. A parallel resonant circuit is provided by a circuit, wherein the aforementioned capacitive element and inductive element are connected in parallel. In this case, the power supply circuit can comprise either a constant current source or a constant voltage source. Designing the LC oscillating circuit as a parallel resonant circuit advantageously allows having less changes in the resonant frequency of the LC oscillating circuit because of surrounding materials like construction materials, windings, ferrites and also because of other materials that can reside on in the vicinity of the LC oscillating circuit like water, snow, dirt, etc.

In another embodiment, the LC oscillating circuit comprises a filter element. The filter element can be arranged within the aforementioned AC part of the object detection system. In particular, the filter element can be a part of the oscillating circuit.

It is, for instance, possible that the capacitive element, e.g. the capacitor, provides the filter element. The filter element provides a DC blocking for the LC oscillating circuit while also providing the capacitive element of the LC oscillating circuit.

It is, however, possible that other or additional filter elements are used. For instance, another capacitive element, e.g. another capacitor, can be arranged in parallel to the LC oscillating circuit, in order to reduce effects of changes in the capacitance of LC oscillating circuit due to materials or substances in a vicinity of the LC oscillating circuit (which are not foreign objects to be detected).

In another embodiment, the object detection system comprises multiple LC oscillating circuits.

These LC oscillating circuits can be arranged such that a predetermined surveillance or detection area is provided. It is, for instance, possible that the LC oscillating circuits are arranged such that a foreign object which is located at an arbitrary position of the active area of the primary winding structure can be detected.

If each LC oscillating circuit comprises a winding structure, the previously described detection surfaces of said winding structures can be arranged such that the active area is completely or at least partially covered by the detection areas in a common plane of projection.

It is, for instance, possible to arrange the winding structures in an array structure. If a geometry of a winding structure of a LC oscillating circuit is hexagonal, the winding structures can be arranged in a honeycomb arrangement. This advantageously provides a high detection sensitivity.

Referring to a vertical direction, which extends perpendicular to a surface of a route, the LC oscillating circuit or at least the inductive element of the oscillating circuit is preferably arranged above the primary winding structure. It is, however, possible that the LC oscillating circuit or at least the inductive element of the LC oscillating circuit is arranged below the primary winding structure.

In another embodiment, the object detection system comprises multiple driving circuits, wherein an output side of each driving circuit is connected to one of the LC oscillating circuits. This means, that each LC oscillating circuit is operated by one driving circuit.

This advantageously allows simultaneous operation of multiple LC oscillating circuits. In this case, different LC oscillating circuits can be operated with the same or different frequencies.

In another embodiment, the object detection system comprises multiple power supply circuits, wherein an input side of each driving circuit is connected to one of the power supply circuits. This means that each driving circuit and thus each LC oscillating circuit is supplied by an individual power supply circuit. In this case, the object detection system can comprise multiple constant voltage sources or multiple constant current sources.

It is, however, also possible that multiple or even all driving circuits are connected to one general power supply circuit. In this case, an input power to multiple or even all LC oscillating circuit is captured.

This advantageously allows minimizing or reducing an installation space required for the proposed object detection system.

In an alternative embodiment, at least two LC oscillating circuits are connectable to one driving circuit. This covers the case that the at least two LC oscillating circuits are simultaneously connected to the driving circuit. In this case, the LC oscillating circuits can be arranged in parallel. An AC output voltage of the driving circuit is provided to all LC oscillating circuits which are connected to the output side of the driving circuit simultaneously.

The proposed embodiment also covers the case that the driving circuit, in particular, the output side of the driving circuit, can be connected only to one of all LC oscillating circuits which are connectable to the output side of the driving circuit. In this case, the LC oscillating circuit can be operated sequentially by one driving circuit. For instance, one of the number of LC oscillating circuits which are connectable to the driving circuit can be connected to the output side of the driving circuit via a switching element.

This also allows reducing a required installation space for the object detection system.

In another embodiment, at least two adjacent LC oscillating circuits are powerable simultaneously. The term powerable means that to each LC oscillating circuit, an alternating current voltage is provided simultaneously. An adjacent LC oscillating circuit denotes the directly neighbouring LC oscillating circuit. In other words, a first LC oscillating circuit and at least another LC oscillating circuit are powerable simultaneously, wherein the other oscillating circuit is provided by the most proximate LC oscillating circuit or one of the group of the most proximate LC oscillating circuits. Adjacent or proximate can relate to a common plane, wherein the LC oscillating circuits, in particular the detection surfaces, are arranged within the common plane.

The at least two LC oscillating circuits can be powered by independent voltage sources. It is, however, also possible to power the at least two LC oscillating circuits by a common voltage source.

If only a single LC oscillating circuit is powered, a density of field lines of the detection field decreases towards the edges of the conductor arrangement providing the LC oscillating circuit, in particular towards the edges of the winding structure, e.g. the coil, providing the inductive element. Thus, a detection sensitivity for an object located at or above an edge portion is decreased.

If at least two adjacent LC oscillating circuits are powered simultaneously, the density of field lines is distributed more equally across the detection surface enclosed by the conductor arrangement or winding structure if compared to the aforementioned scenario of only one LC oscillating circuit being powered. This advantageously increases the detection sensitivity in particular for an object located at or above an edge portion. Also, smaller objects can be detected more reliably.

As described previously, the winding structure can have a circular shape, a hexagonal shape, a rectangular or square shape. It is also possible that the winding structure is designed as a spiral or helical winding structure.

It is possible that, if at least two adjacent LC oscillating circuits are powered simultaneously, only the input power of one of the at least two LC oscillating circuits is detected or measured. The input power of the at least one adjacent LC oscillating circuit does not need to be measured. It is, of course, also possible that, if at least two adjacent LC oscillating circuits are powered, the input power of multiple or all LC oscillating circuits is detected or measured.

The LC oscillating circuits, in particular the winding structures providing the inductive elements of the LC oscillating circuits can be arranged in an array-like or matrix-like arrangement. This means that in a common plane, an arrangement of multiple winding structures provides multiple columns and/or multiple rows, wherein a winding structure is arranged at each row/column-position.

The array-like or matrix-like structure can cover the aforementioned charging surface at least partially, e.g. more than 80%, 90% or 95% of the charging surface. In this context, "covers" means that a least a part of the, preferably the total, primary field or total field extends through the array-like or matrix-like structure or a surface provided by the array-like or matrix-like structure. The array-like or matrix-like structure can be part of the primary unit.

The term "covers" can also mean that in a common plane of projection, an area enclosed by a minimal envelope of the array-like or matrix-like structure overlaps with the aforementioned charging surface at least partially.

Center points of the winding structures can be arranged with respect to one another with predetermined longitudinal and/or lateral distances, wherein a longitudinal direction is oriented parallel to a direction of travel of the vehicle and the lateral direction is oriented perpendicular to the longitudinal direction. Both, the longitudinal and the lateral direction, are perpendicular to a vertical direction.

In other words, a sheet-like structure comprising multiple winding structures can be provided. The multiple LC oscillating circuits can be located in an interspace between the primary winding and the charging surface. The multiple LC oscillating circuits can be part of the route, e.g. located in a layer of the route which is arranged under the route surface or located in a layer of the route which provides the route surface. The primary winding structure can be covered by the array-like or matrix-like structure of the multiple winding structures.

It is also possible that multiple LC oscillating circuits or winding structures of multiple LC oscillating circuits are arranged in at least two different planes which are arranged with a predetermined distance, in particular a predetermined vertical distance, relative to each other. In this case, the multiple LC oscillating circuits or the respective winding structures can be arranged such that in a common plane of projection, at least two LC oscillating circuits or the respective winding structures which are located in different planes overlap with a predetermined overlap area. It is, however, also possible that the multiple LC oscillating circuits or the respective winding structures can be arranged such that there is no overlap of at least two LC oscillating circuits or the respective winding structures which are located in different planes in the common plane of projection.

Further proposed is a method of operating an object detection system according to one of the previously described embodiments. Within the method, the driving circuit, in particular a frequency of an AC output voltage of the driving circuit, is controlled such that an alternating output voltage is provided to the at least one LC oscillating circuit. If the driving circuit is provided by a half bridge, switching times of the switching elements of said half bridge can be controlled such that an alternating output voltage with a desired frequency is provided.

According to the invention, an input power to the driving circuit provided by the power supply circuit is captured, e.g. by a power sensor. A foreign object is detected depending on the captured input power, in particular a time course of captured input power.

The proposed method advantageously allows a reliable detection of a foreign object with a high detection sensitivity.

In a preferred embodiment, the foreign object is detected if the captured input power increases.

As explained previously, the input power increases due to power consumed by the foreign object and the shift of the resonant frequency of the LC oscillating circuit due to the presence of the foreign object. Detecting a foreign object only if the input power increases therefore minimizes a false detection which, in turn, improves the detection reliability.

It is possible that a foreign object is only detected if the input power increases more than a certain or predetermined percentage of a current input power, e.g. more than 1.5 percent.

It is possible that the object detection system comprises multiple (different) LC oscillating circuits. In that case, the LC oscillating circuits, which can be also referred to as cells, can be scanned sequentially. This means that the input power of the cells is determined sequentially. Alternatively, all cells can be scanned simultaneously. Alternatively, cells of a group of multiple cells can be scanned simultaneously, wherein the groups are scanned sequentially.

In another embodiment, a frequency of the alternating output voltage provided by the driving circuit is equal to a resonant frequency of the LC oscillating circuit or differs from said resonant frequency by at most a predetermined amount. This advantageously allows a power saving operation of the LC oscillating circuit.

In another embodiment, the frequency of the alternating output voltage provided by the driving circuit is different from a frequency of the power transfer field generated by the primary unit. In particular, the frequency can be higher, in particular more than 10% higher, than the operating frequency of the primary winding structure.

This advantageously allows decoupling the detection quality of the proposed object detection system from the presence of power transfer field.

In another embodiment, the frequency of the alternating output provided by the driving circuit is varied. This means that during a first time interval, the driving circuit can be operated such that the alternating output voltage has a first frequency. During another time interval the driving circuit can be operated such that the alternating output voltage has another frequency. Object detection, in particular an evaluation of the captured input power is performed during the first and the other time interval. This advantageously allows reducing the effect of tolerances in the LC oscillating circuits. If, for example, a resonant frequency of a LC oscillating circuit is not known exactly, operating such a LC oscillating circuit with different frequencies and performing object detection for all these different operating frequencies can advantageously increase a reliability and sensitivity of object detection.

It is also possible to calibrate the object detection system before operation. By said calibration, operating parameters of the object detection system for each LC oscillating circuit can be determined. It is, for instance, possible, to adjust the driving frequency for each LC oscillating circuit such that tolerance-based effects are eliminated. Thus, each LC oscillating circuit can be operated with a different driving frequency. It is also possible to set the operating parameters of each LC oscillating circuit such that the amplitudes of the driving voltages and/or currents of each LC oscillating circuit are equal or such that the input power of each LC oscillating circuit is equal and varies in a comparable way in case a foreign object is present.

The calibration of the object detection allows determining absolute parameters for an object detection. This means that a foreign object is detected if a predetermined input power is detected. The predetermined input power can e.g. be determined for a predetermined set of operating parameters.

Alternatively, an object detection can be performed based on a change, in particular a change within a predetermined period of time, of the input power. This means for example that a foreign object can be detected if a change of the input power, in particular within a predetermined period of time, is higher than a predetermined percentage, e.g. 1%, 5% or 10% of the current input power, e.g. the input power at the beginning of the predetermined period of time. Also, a gradient-based detection can be performed. This means that a foreign object is detected if a gradient of the time course of the input power is higher than a predetermined threshold value. If, e.g., the input power performs a step-like increase or another type of steep increase, the gradient will be higher than the predetermined threshold. The change of the input power, in particular the gradient, can be detected based on successive measurements of the input power, e.g. measurements with a predetermined frequency.

In another embodiment, the object detection system comprises multiple (different) LC oscillating circuits wherein at least two of the LC oscillating circuits are operated with different frequencies. Of course it is possible that these frequencies can be varied as mentioned before.

This advantageously helps to spread out the spectrum of electromagnetic emission and advantageously allows a shortening of the sampling time.

In another embodiment, the object detection system comprises multiple LC oscillating circuits, wherein at least two of the LC oscillating circuits are powered simultaneously. As illustrated previously, this advantageously improves a detection sensitivity in particular for foreign objects located in the proximity of an edge of a LC oscillating circuit or a winding structure of a LC oscillating circuit.

Further proposed is a method of building an object detection system for an inductive power transfer system, in particular for transferring power to a vehicle on a surface of a route. Within said method, at least one LC oscillating circuit, at least one driving circuit, and at least one power supply circuit are provided. An input side of the driving circuit is connected to the power supply circuit and an output side of the driving circuit is connected to the at least one LC oscillating circuit.

According to the invention, at least one means for capturing an input power to the driving circuit provided by the power supply circuit and at least one detection means for detecting a foreign object depending on the captured input power is provided.

Also described is a primary unit of an inductive power transfer system, wherein the primary unit comprises a primary winding structure for generating a (electro-) magnetic power transfer field. The primary unit comprises an object detection system according to one of the previously described embodiments.

BRIEF DESCRIPTION OF THE DRAWINGS

The invention will be described with reference to the attached figures. The figures show.

DETAILED DESCRIPTION OF THE INVENTION

Figure 1:
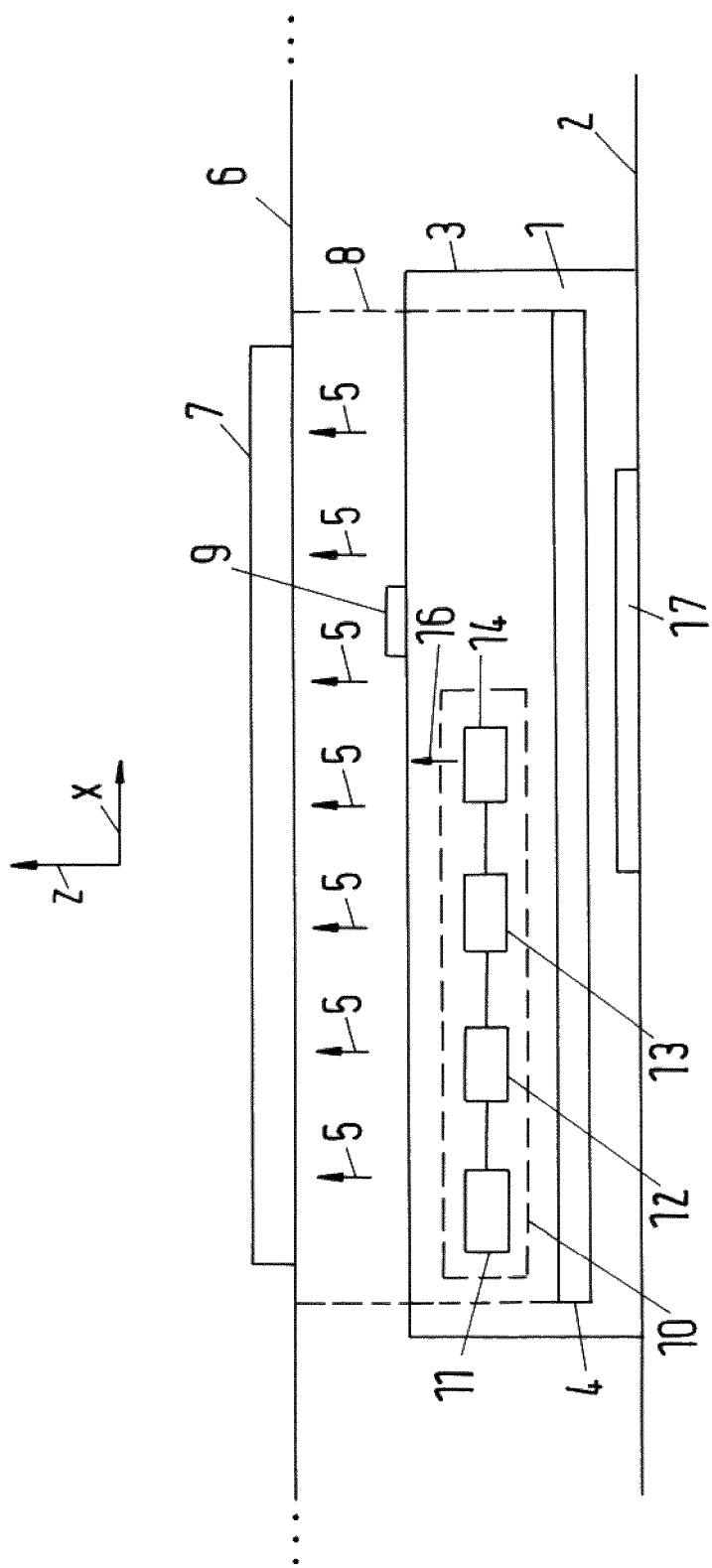
FIG. 1 a schematic side view of an inductive power transfer system.

In FIG. 1, a schematic side view of an inductive power transfer system 1 is shown. An inductive power transfer pad (IPT pad) 1 is installed on a surface 2 of a route. The IPT pad 1 comprises a housing 3. Within the housing 3, a primary winding structure 4 is arranged. An inverter (not shown) is used to provide an alternating voltage to the primary winding structure 4 such that the primary winding structure 4 generates a power transfer field which is indicated by arrows 5. The power transfer field extends in a vertical direction z to a vehicle 6, in particular to a receiving device 7 or pick-up attached to the vehicle 6.

Shown by dashed lines is an active area 8 of the primary winding structure 4. If a top surface of the housing 3 is defined as a plane of projection, the active area 8 is enclosed by an envelope of the primary winding structure 4. A longitudinal direction x is oriented perpendicular to the vertical direction z and can correspond to a traveling direction of the vehicle 6 if the vehicle 6 travels straightforward.

A foreign object 9 is located on the top surface of the housing 3 within the active area 8. Such a foreign object 9 can heat up if the power transfer field extends through the foreign object 9.

The primary unit 1 comprises also an object detection system 10. The object detection system 10 can be used to detect the presence of the foreign object 9.

The foreign object 10 comprises a voltage source 11, a power sensor 12, a driving circuit 13 and a LC oscillating circuit 14. The driving circuit 13 transforms a DC input voltage UI which is provided by the voltage source 11 into an AC output voltage UO (see FIG. 2). The AC output voltage UO has a frequency which is equal to a resonant frequency of the LC oscillating circuit 14. As shown in FIG. 2, the oscillating circuit 14 comprises a coil 15 which generates a local detection field 16 if the AC output voltage UO is applied to the LC oscillating circuit 14. The foreign object 9 will alter characteristics of the detection field 16 which, in turn, results in a change of an input power of the driving circuit 13. This change is captured by the power sensor 12.

Further shown is a printed circuit board 17, wherein electric and electronic components such as compensating capacitors and elements of the power inverter to operate the primary winding structure 4 can be installed on the printed circuit board 17.

In FIG. 1 it is shown that the object detection system 10 or at least parts of the LC oscillating circuit 14 are, with respect to the vertical direction z, arranged above the printed circuit board 17 and the primary winding structure 4. A top surface of the housing 3 is arranged above the primary winding structure 4 and the object detection system 10.

Figure 2A:
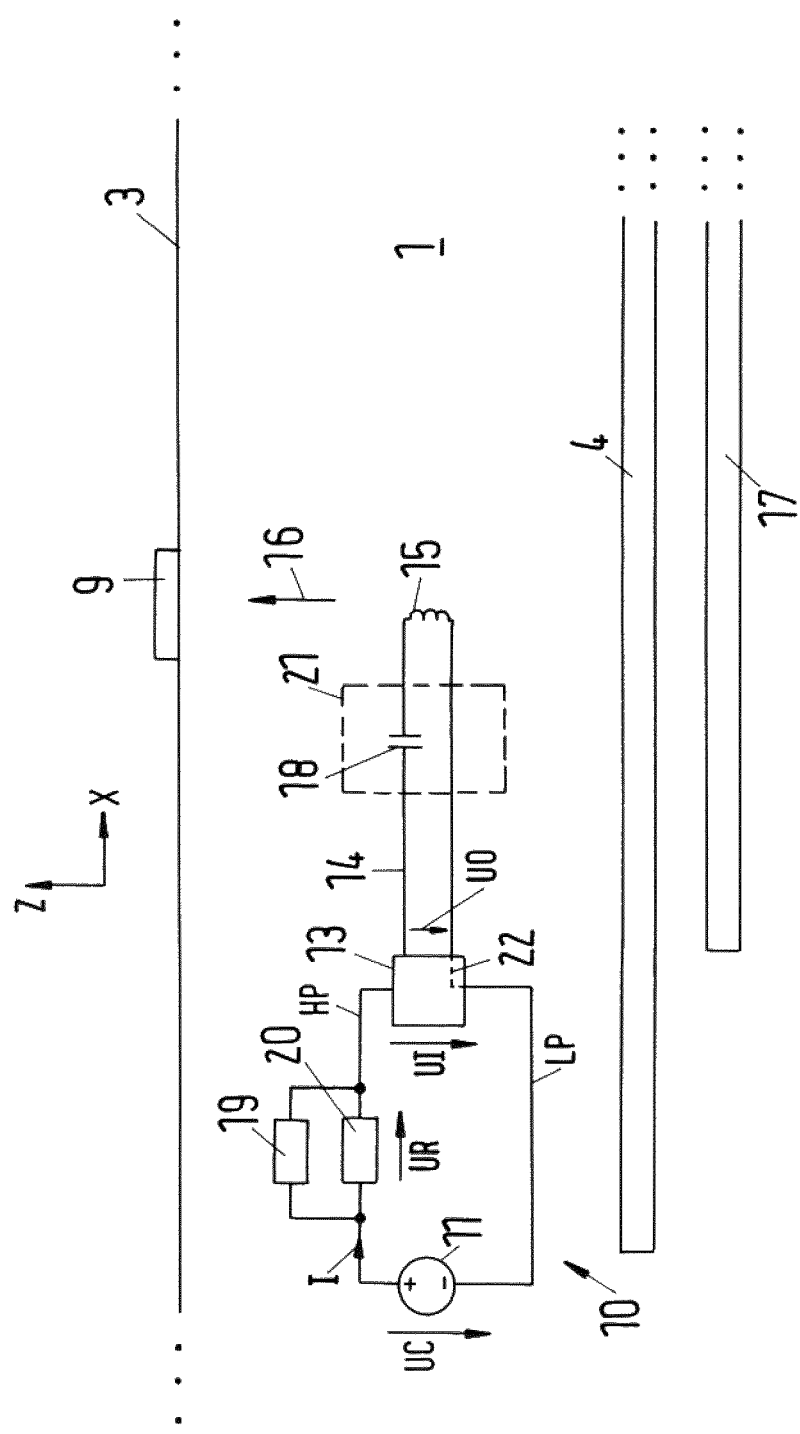
FIG. 2a a schematic block diagram of a first object detection system.

In FIG. 2a, a schematic block diagram of a first object detection system 10 is shown. The voltage source 11 can be designed as a constant voltage source which provides a constant voltage UC. It is shown that the input voltage UI falls across input terminals of the driving circuit 13. In particular, a first input terminal is connected to a high potential HP of the object detection system 10, wherein a second input terminal is connected to a low potential LP of the object detection system 10.

Also shown is an output voltage UO of the driving circuit 13 which falls across output terminals of the driving circuit 13 to which the series resonant circuit 14 is connected. A potential of the output terminals can be different from a potential of the input terminals. It is, however, possible that the potential of at least one input terminal is equal to the potential of one output terminal. In FIG. 2a, a dashed line 22 shows that the potential of a low potential input terminal of the driving circuit 13 is equal to the low potential LP of the object detection system 10 and equal to the potential of the low potential output terminal of the driving circuit 13.

The series resonant circuit 14 comprises a series connection of a capacitor 18 and the coil 15. In this case, the coil 15 provides an inductive element of the series resonant circuit 14. In FIG. 2a it is shown that the coil 15 is, with respect to the vertical direction z, arranged above the primary winding structure 4. As stated before, the capacitor 18 is a part of the series resonant circuit 14. Simultaneously, the capacitor 18 provides a filter element 21 which filters voltage/current components within the series resonant circuit 14 with a frequency below the resonant frequency of the series resonant circuit 14. Thus, an interaction of the power transfer field with the detection system 10 can be minimized.

Capturing of the input power of the driving circuit 13 is performed by a voltage sensor 19 which captures a voltage UR falling across a resistor 20, wherein the resistor 20 is arranged in a current path connecting the constant voltage source 11 and the driving circuit 13. The voltage UR is proportional to an input current I of the driving circuit 13. The input power can thus be calculated as the product of the input current I and output voltage UC of the constant voltage source 11 or the product of the input current I and the input voltage UI of the driving circuit. It is also possible to directly take the input current I or the voltage UR as a measure for the input power.

Simulations have shown that the input power does not increase if no foreign object 9 is placed within the vicinity of the object detection system 10 and the primary winding structure is energized. Also, there is no increase of the input power if there is no foreign object 9 and the coil 15 is heated up.

The input power, however, increases if a foreign object 9 is placed within a vicinity of the coil 15, in particular in an area through which field lines of the detection field 16 extend. Simulations have shown that the increase of the input power is approximately of the same size in a scenario where the primary winding structure 4 is energized and in a scenario where the primary winding structure is not energized.

Figure 2B:
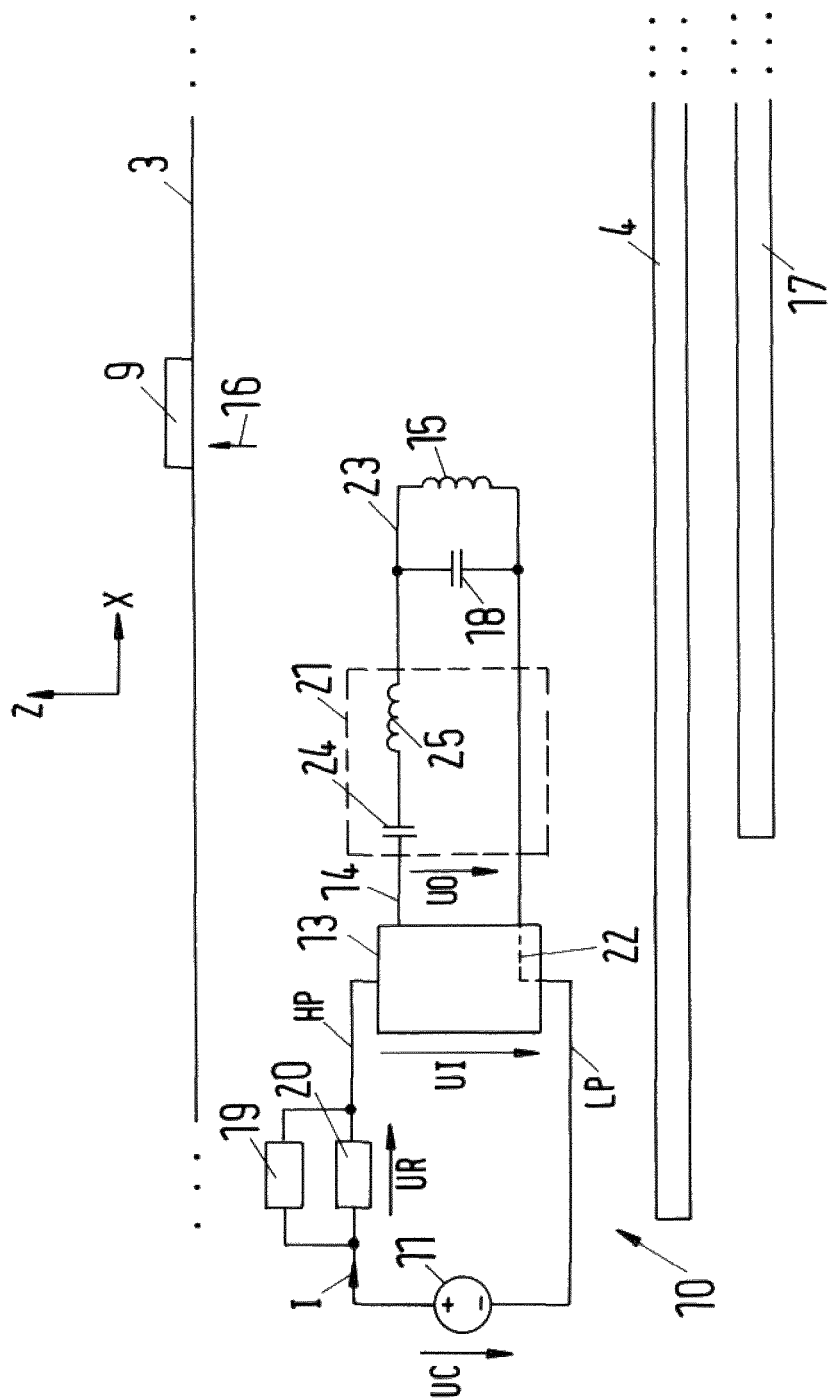
FIG. 2b a schematic block diagram of a second object detection system

In FIG. 2b, a schematic block diagram of a second object detection system 10 is shown. In contrast the object detection system 10 shown in FIG. 2a, the LC oscillating circuit 14 comprises a parallel resonant circuit 23, wherein the parallel resonant circuit 23 comprises a capacitor 18 connected in parallel to a coil 15. Also, the filter element 21 is comprises another capacitor 24 and another coil 25 which are connected in series. As stated before, the capacitor 24 and the coil 25 of the filter element 21 are designed such that a voltage/current induced by the power transfer field in the LC oscillating circuit 14 are minimized. Thus, the LC oscillating circuit 14 is provided by the capacitor 24 and the coil 25 of the filter element 21 and the elements of the parallel resonant circuit 23.

Figure 2C:
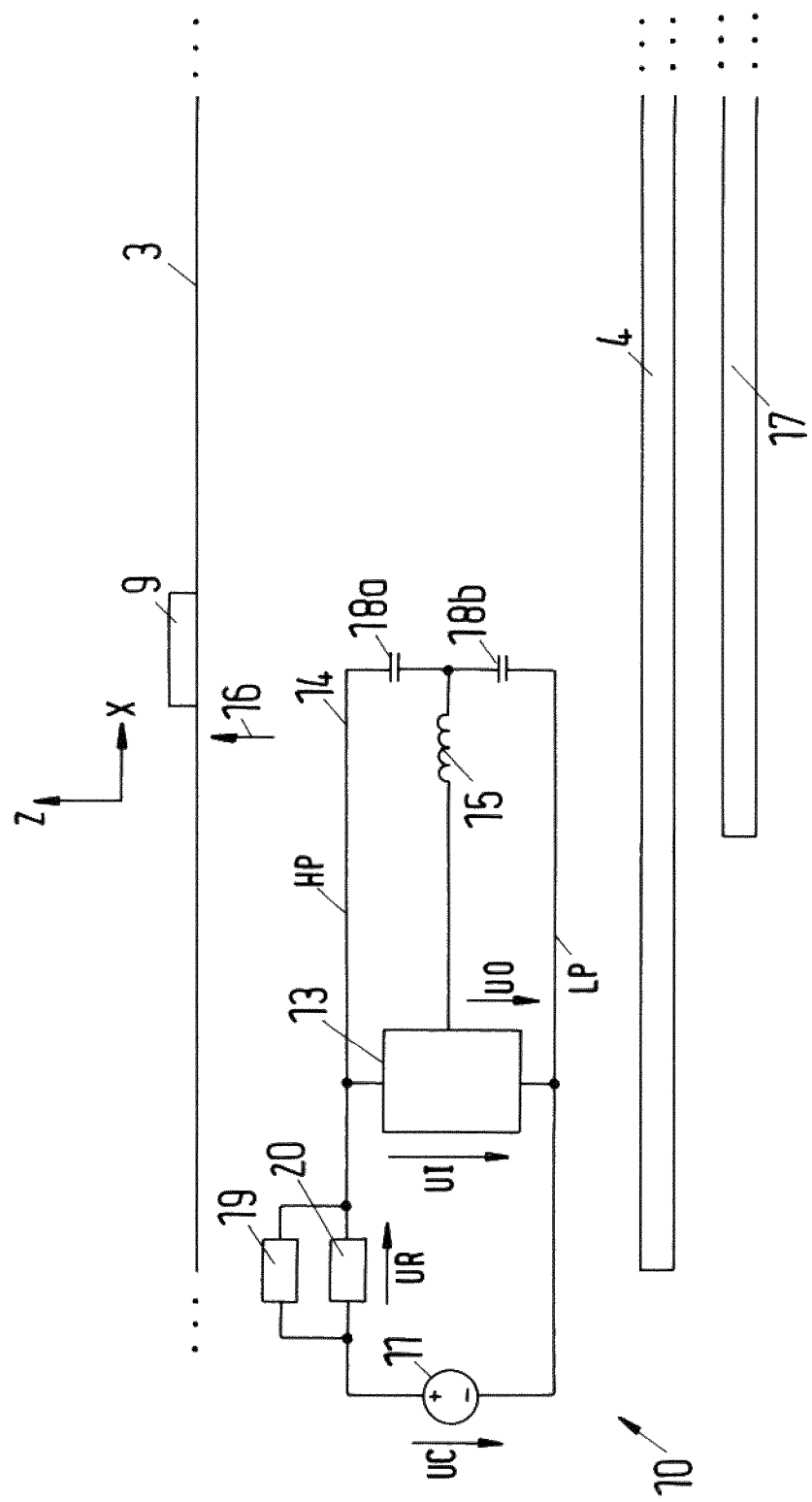
FIG. 2c a schematic block diagram of a third object detection system.

In FIG. 2c, a schematic block diagram of a third object detection system 10 is shown. In contrast the object detection system 10 shown in FIG. 2a, the capacitance of the LC oscillating circuit 14 is provided by two capacitors 18a, 18b, wherein a second terminal of a first capacitor 18a is connected to a first terminal of another capacitor 18b. A second terminal of a coil 15 is connected to a connecting portion which connects the two capacitors 18a, 18b. A first terminal of the first capacitor 18a is connected to a high potential HP of the object detection system 10, e.g. a first input terminal of the driving circuit 13. A second terminal of the second capacitor 18a is connected to a low potential LP of the object detection system 10, e.g. a second input terminal of the driving circuit 13. A first terminal of the coil 15 is connected to an output terminal of the driving circuit 13, which can e.g. be connected to a connecting portion of two switching elements (not shown) of the driving circuit 13.

Figure 3:
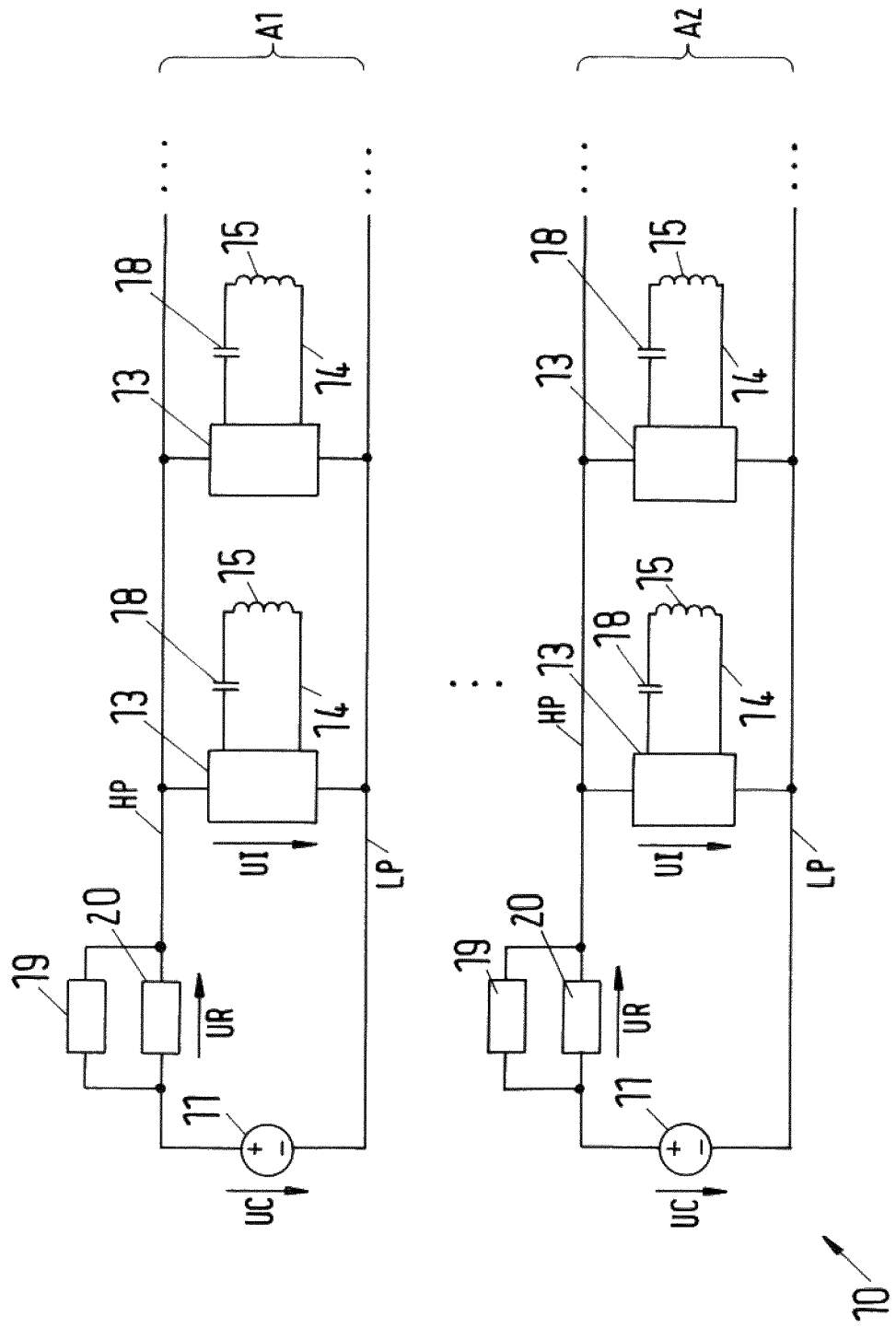
FIG. 3 a schematic block diagram of an array of multiple LC oscillating circuits, FIG. 4 a schematic block diagram of another array of multiple LC oscillating circuits, FIG. 5 a schematic block diagram of a proposed object detection system, and FIG. 6 a schematic block diagram of a two adjacent LC oscillating circuits.

In FIG. 3, a schematic block diagram of an array of multiple LC oscillating circuits 14 is shown. The object detection system 10 comprises multiple arrays of LC oscillating circuits 14, wherein only two arrays A1, A2 are shown. Each array A1, A2 comprises a constant voltage source 11 which provides a constant voltage UC. Furthermore, each array A1, A2 comprises a voltage sensor 19 which captures a voltage UR falling across a resistor 20, wherein the resistor 20 is arranged in a current path connecting the constant voltage source 11 and multiple driving circuits 13. To each driving circuit 13, a LC oscillating circuit 14 as shown in FIG. 2a is connected, in particular to output terminals of each driving circuit 13.

All driving circuits 13 are connected in parallel. This means that a first input terminal of each driving circuit 13 is connected to a high potential HP of the object detection system 10, wherein a second input terminal of each driving circuit 13 is connected to a low potential LP of the object detection system 10. Each array A1, A2 can comprise e.g. 8 driving circuits 13.

The input power can be determined for each LC oscillating circuit 14 of each array A1, A2 sequentially. Alternatively, the input power can be determined for all LC oscillating circuits 14 of all arrays A1, A2 simultaneously. Alternatively, the input power can be determined for all LC oscillating circuits 14 of one of the arrays A1, A2 simultaneously, wherein the input power for each array A1, A2 is determined sequentially.

Figure 4:
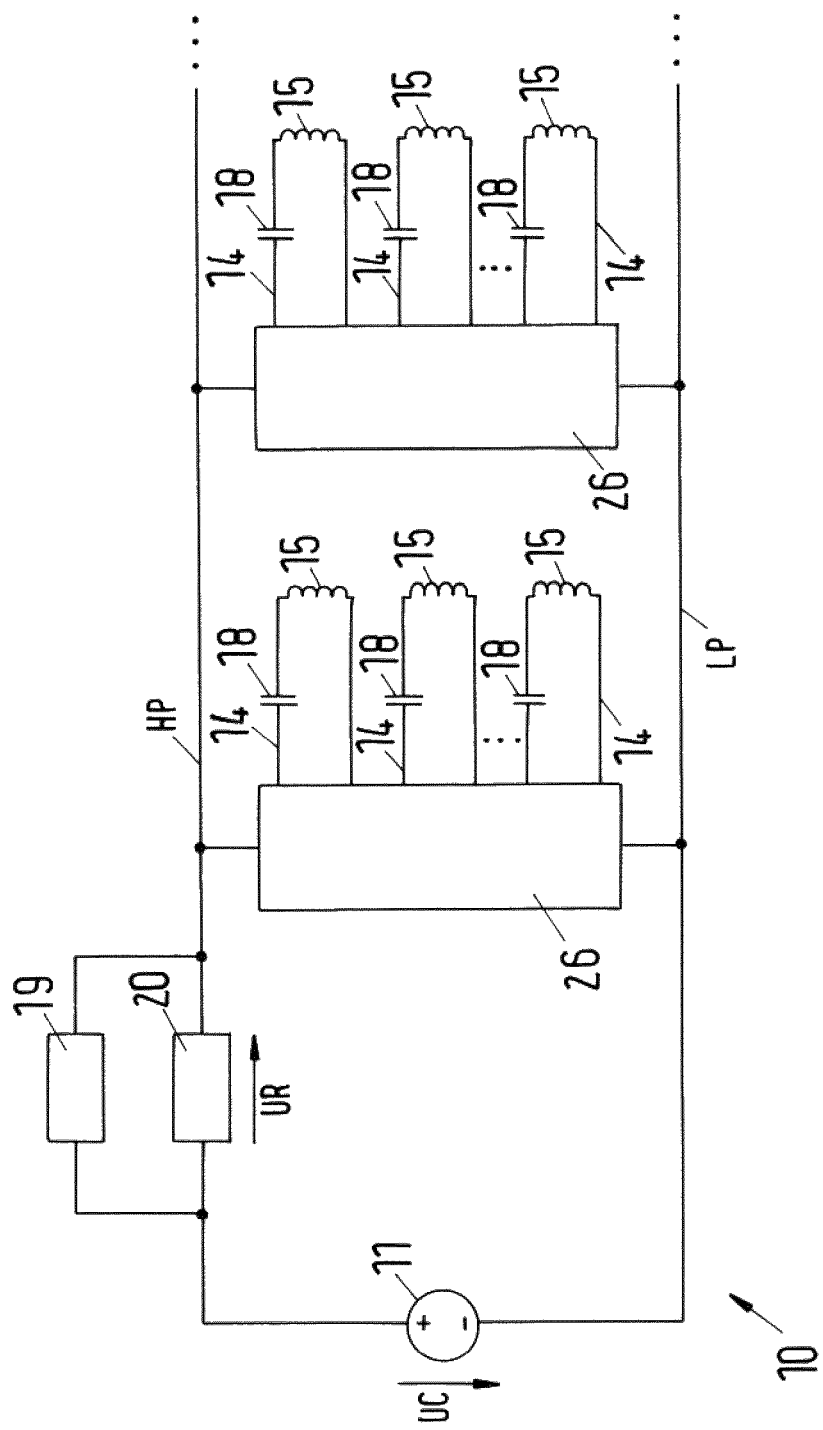

In FIG. 4, a schematic block diagram of another array of multiple LC oscillating circuits 14 is shown. An object detection system 10 comprises a constant voltage source 11 which provides a constant voltage UC. Furthermore, the object detection system 10 comprises a voltage sensor 19 which captures a voltage UR falling across a resistor 20, wherein the resistor 20 is arranged in a current path connecting the constant voltage source 11 and multiple integrated circuits 26. To each integrated circuit 26, multiple LC oscillating circuits 14 as shown in FIG. 2a are connected, in particular to output terminals of each integrated circuit 26. The integrated circuit 26 provides the function of a driving circuit 13 for each of the LC oscillating circuits 14 connected to the respective integrated circuit 26.

All integrated circuits 26 are connected in parallel. This means that a first input terminal of each integrated circuit 26 is connected to a high potential HP of the object detection system 10, wherein a second input terminal of each integrated circuit 26 is connected to a low potential LP of the object detection system 10. Each integrated circuit 26 can be connected to e.g. 8 LC oscillating circuits 14.

The input power can be determined for each LC oscillating circuit 14 of each integrated circuit 26 sequentially. Alternatively, the input power can be determined for all LC oscillating circuits 14 of all integrated circuits 26 simultaneously. Alternatively, the input power can be determined for all LC oscillating circuits 14 of one integrated circuit 26 simultaneously, wherein the input power for each integrated circuit 26 is determined sequentially.

Figure 5:
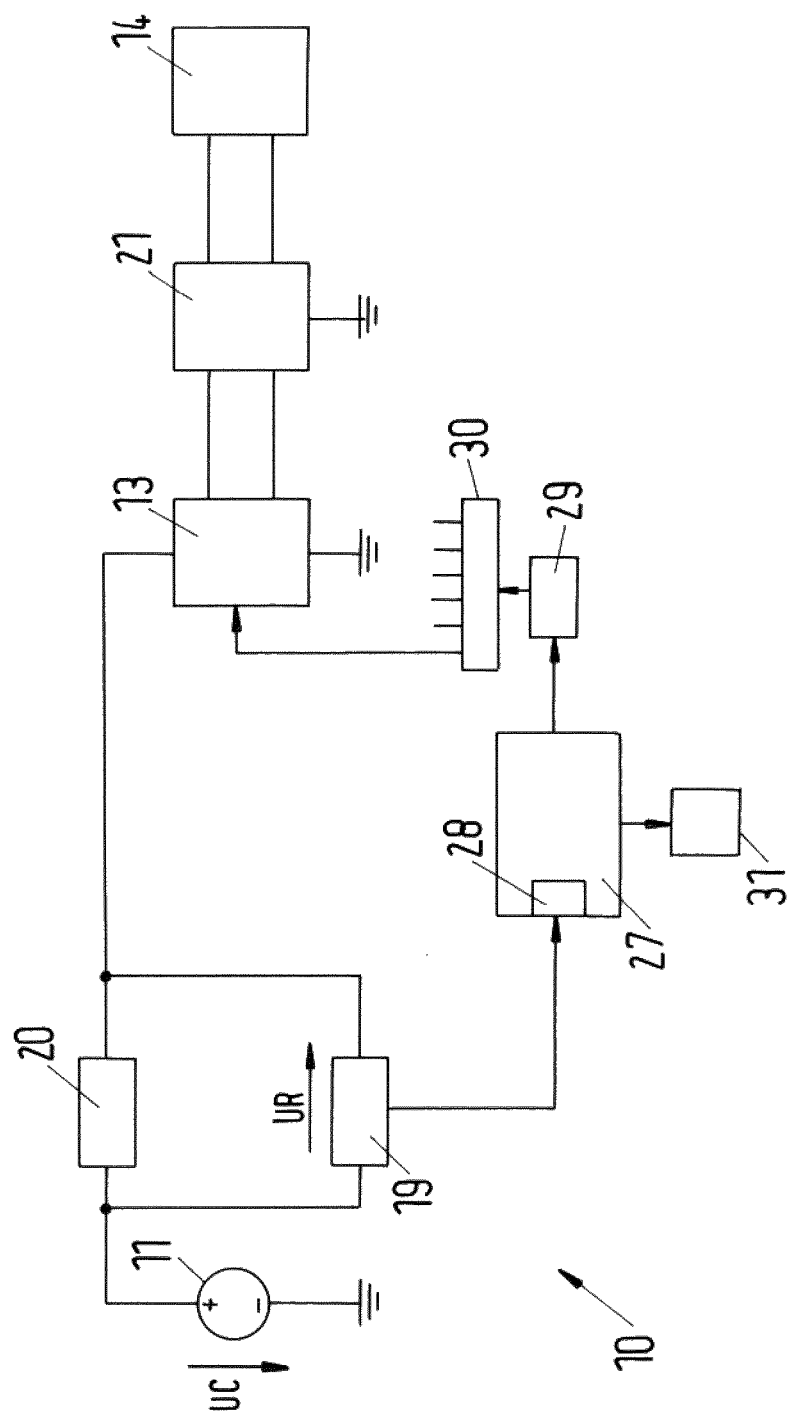

FIG. 5 shows a schematic block diagram of a proposed object detection system 10. The object detection system 10 comprises a constant voltage source 11 which provides a constant voltage UC. Furthermore, the object detection system 10 comprises a voltage sensor 19 which captures a voltage UR falling across a resistor 20, wherein the resistor 20 is arranged in a current path connecting the constant voltage source 11 and a driving circuit 13. A filter element 21 and a LC oscillating circuit 14 are connected to the driving circuit 13. An output signal of the voltage sensor 19 is provided to a control unit 27, e.g. a microcontroller, in particular to an A/D-converter portion 28 of the control unit 27. The control unit 27 controls a frequency generator 29 for the driving circuit 13, wherein e.g. a switching frequency of switching elements of the driving circuit 13 is set depending on an output signal of the frequency generator 29. The driving circuit 13 is connected to the frequency generator 29 via a demultiplexing unit 30. The demultiplexing unit 30 can be used to connect the frequency generator 29 to multiple driving circuits 13.

The control unit 27 is also connected to a communication system 31, e.g. a bus in order to receive and transmit signals to other units of e.g. the primary unit.

Depending on a course of the output signal of the voltage sensor 19, the control unit 27 can determine if a foreign object is placed in the proximity of the LC oscillating circuit 14.

Figure 6:
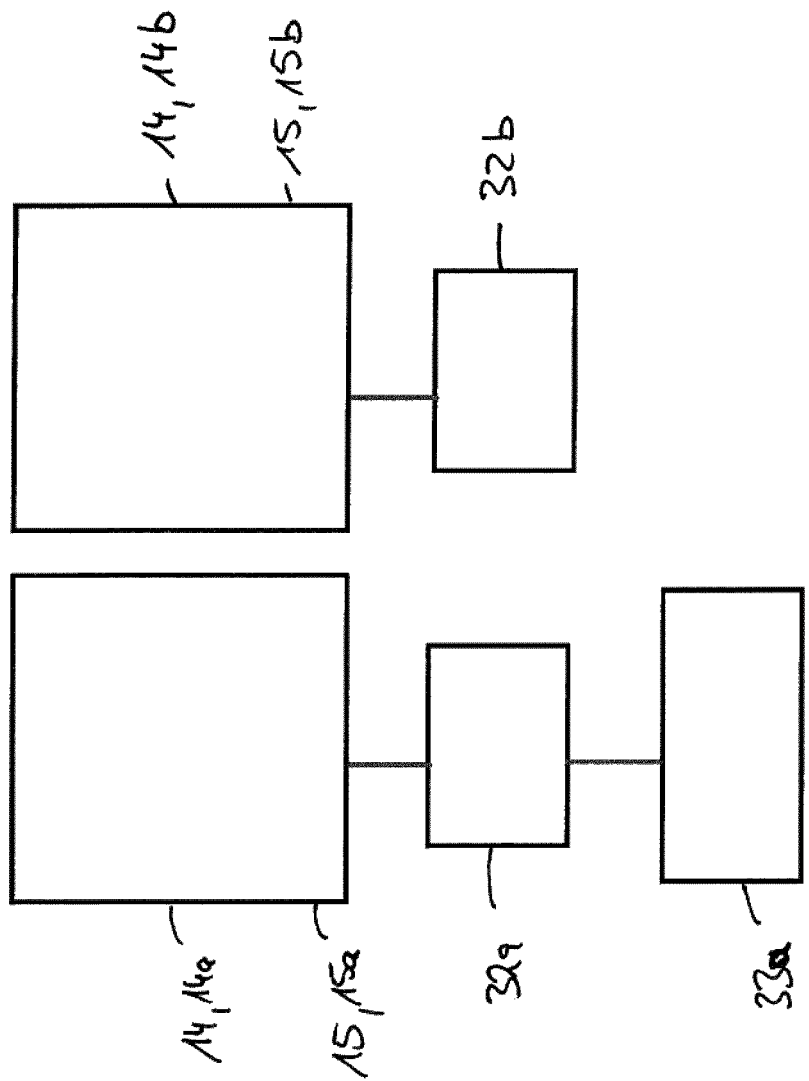

FIG. 6 shows a schematic block diagram of two adjacent LC oscillating circuits 14, 14a, 14b. A first LC oscillating circuit 14a comprises a rectangular-shaped coil 15a providing an inductive element of the first LC oscillating circuit 14a. The coil 15a of the first LC oscillating circuit 14a can also be denoted as detection coil. Another LC oscillating circuit 14b comprises a rectangular-shaped coil 15b providing an inductive element of the other LC oscillating circuit 14b. The coil 15b of the other LC oscillating circuit 14b can also be denoted as supporting coil.

The coils 15a, 15b are arranged adjacent to each other in a common plane which corresponds to the plane of projection of FIG. 6. Also schematically shown are driving circuitries 32a, 32b of each of the LC oscillating circuits 14a, 14b. The driving circuitries 32a, 32b e.g. comprise a constant voltage source 11 and a driving circuit 13 (see FIG. 1). The first LC oscillating circuit 14a is powerable or can be energized by the first driving circuitry 32a and the other LC oscillating circuit 14a is powerable or can be energized by the other driving circuitry 32b. This setup allows powering or energizing both LC oscillating circuits 14a, 14b simultaneously and independently of each other. Also schematically shown is a detection circuitry 33a which is assigned exclusively to the first LC oscillating circuit 14a. By means of the detection circuitry 33a, an input power of the first LC oscillating circuit 14a is detectable. In the setup shown, only the input power of the first LC oscillating circuit 14a is detectable. Powering both LC oscillating circuits 14a, 14b simultaneously generates a magnetic field distribution within the detection area enclosed by the detection coil, wherein a decrease of the density of field lines towards the edge of the detection coil, in particular the edge of the detection coil adjacent to an edge of the supporting coil, is reduced. As mentioned before, this increases an overall detection sensitivity.

In FIG. 6, only two adjacent LC oscillating circuits 14a, 14b are shown. It is, of course possible that more than one supporting coil is arranged adjacent to the detection coil. In particular, four or eight supporting coils can be arranged adjacent to the detection coil.

The invention claimed is:

1. An object detection system for an inductive power transfer system for transferring power to a vehicle on a surface of a route, wherein the object detection system comprises at least one LC oscillating circuit and at least one driving circuit, wherein an input side of the driving circuit is connected to a power supply circuit and an output side of the driving circuit is connected to the at least one LC oscillating circuit, wherein the driving circuit provides an alternating current voltage to the at least one oscillating circuit,
wherein the object detection system comprises at least one means for capturing an input power to the driving circuit provided by the power supply circuit, wherein the at least one means for capturing the input power to the driving circuit provided by the power supply circuit comprises a sensor, and wherein the object detection system comprises at least one detection means for detecting a foreign object depending on the captured input power, wherein the at least one detection means for detecting the foreign object depending on the captured input power comprises a control unit.

2. The object detection system according to claim 1, wherein the driving circuit is provided by a half bridge.

3. The object detection system according to claim 1, wherein the power supply circuit comprises a constant voltage source, wherein the object detection system comprises the sensor for capturing an input current to the driving circuit, and wherein the input power is determined depending on an output voltage of the constant voltage source and the captured input current.

4. The object detection system according to claim 1, wherein the power supply circuit comprises a constant current source, wherein the object detection system comprises the sensor for capturing an input voltage to the driving circuit, and wherein the input power is determined depending on an output current of the constant current source and the captured input voltage of the driving circuit.

5. The object detection system according to claim 1, wherein the LC oscillating circuit is designed as a series resonant circuit.

6. The object detection system according to claim 1, wherein the LC oscillating circuit is designed as a parallel resonant circuit.

7. The object detection system according to claim 1, wherein the LC oscillating circuit comprises a filter element.

8. The object detection system according to claim 1, wherein the object detection system comprises multiple LC oscillating circuits.

9. The object detection system according to claim 8, wherein the object detection system comprises multiple driving circuits, and wherein an output side of each driving circuit is connected to one of the LC oscillating circuits.

10. The object detection system according to claim 9, wherein the object detection system comprises multiple power supply circuits, and wherein an input side of each driving circuit is connected to one of the power supply circuits.

11. The object detection system according to claim 8, wherein at least two LC oscillating circuits are connectable to one driving circuit.

12. The object detection system according to claim 8, wherein at least two adjacent LC oscillating circuits are powerable simultaneously.

13. A method of operating an object detection system according to claim 1, comprising the steps of:
controlling a driving circuit, thereby providing an alternating output voltage to the at least one LC oscillating circuit, and
capturing an input power to the driving circuit provided by the power supply circuit, and detecting a foreign object depending on the captured input power.

14. The method according to claim 13, wherein the foreign object is detected if the captured input power increases.

15. The method of according to claim 13, wherein a frequency of the alternating output voltage provided by the driving circuit is equal to a resonant frequency of the LC oscillating circuit or differs from the resonant frequency by at most a predetermined amount.

16. The method according to claim 15, wherein the frequency of the alternating output voltage provided by the driving circuit is different from a frequency of the power transfer field generated by the primary unit.

17. The method according to claim 15, wherein the frequency of the alternating output voltage provided by the driving circuit is varied.

18. The method according to claim 13, wherein the object detection system comprises multiple LC oscillating circuits, wherein at least two of the LC oscillating circuits are operated with different frequencies.

19. The method according to claim 13, wherein the object detection system comprises multiple LC oscillating circuits, wherein at least two adjacent LC oscillating circuits are powered simultaneously.

20. A method of building an object detection system for an inductive power transfer system, comprising the steps of:
providing at least one LC oscillating circuit,
providing at least one driving circuit,
providing at least one power supply circuit,
connecting an input side of the driving circuit to the power supply circuit and connecting an output side of the driving circuit to the at least one LC oscillating circuit, and
providing at least one means, comprising a sensor, for capturing an input power to the driving circuit by the power supply circuit and providing at least one detection means comprising a control unit, for detecting a foreign object depending on the captured input power.

* * * * *

UNITED STATES PATENT AND TRADEMARK OFFICE
CERTIFICATE OF CORRECTION

PATENT NO. : 10,103,583 B2
APPLICATION NO. : 14/901218
DATED : October 16, 2018
INVENTOR(S) : Marnix Lannoije et al.

Page 1 of 1

It is certified that error appears in the above-identified patent and that said Letters Patent is hereby corrected as shown below:

In the Claims

Column 16, Line 36, Claim 15, after "method" delete "of"

Column 17, Line 1, Claim 20, delete "means" and insert -- means, --

Signed and Sealed this
Twenty-second Day of January, 2019

Andrei Iancu
*Director of the United States Patent and Trademark Office*